March 7, 1944.　　G. L. NEELY ET AL　　2,343,569
PRETREATED BEARING SURFACE AND METHOD OF PRODUCING THE SAME
Filed Nov. 3, 1941
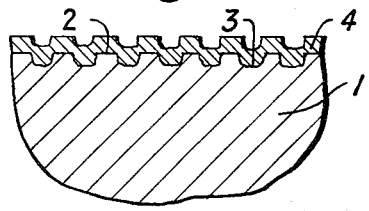
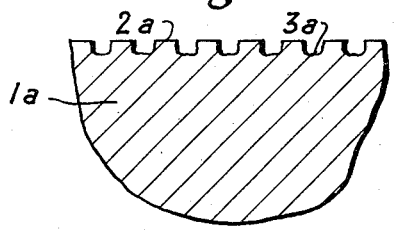
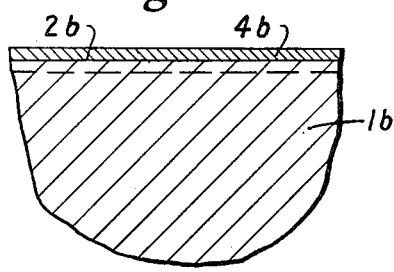
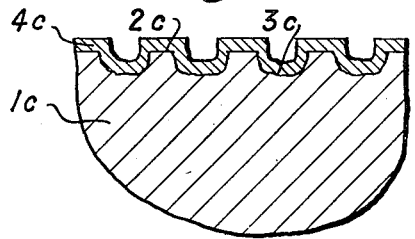
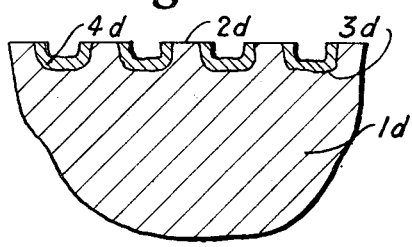
Inventors
GEORGE L. NEELY
BRUCE B. FARRINGTON
VICTOR N. BORSOFF
By  Attorney Patented Mar. 7, 1944

2,343,569

UNITED STATES PATENT OFFICE 2,343,569

PRETREATED BEARING SURFACE AND METHOD OF PRODUCING THE SAME

George L. Neely, Bruce B. Farrington, and Victor N. Borsoff, Berkeley, Calif., assignors to Standard Oil Company of California, San Francisco, Calif., a corporation of Delaware Application November 3, 1941, Serial No. 417,624

14 Claims. (Cl. 148—6.5)

This invention relates to pretreated bearing surfaces and to a method of producing the same.

By pretreated metal bearing surfaces it is understood that applicants refer to a surface which is treated to produce a bearing, or wearing, surface before it is used as a machine element, and preferably before the member containing such surface is assembled or incorporated in the machine. It is also to be understood that by "bearing" or "wearing" surfaces applicants are referring to such surfaces as may be in bearing or wearing contact in relative reciprocating or rotating parts, which relatively reciprocating or rotating parts are in contact at the surfaces treated such, for example, as the surfaces of pistons and cylinders, piston rings, cylinder liners or engine blocks, the wearing or bearing surfaces between gears, such as hypoid gears, or other sets of bearing or wearing surfaces as an illustrative example as are incorporated, or are present, in an automobile assembly, engine, transmission, differential, or the like, or in any other similar machine or mechanism.

In the bearing, or wearing, surface art, and in the use or production of such bearing or wearing surfaces where scuffing and scoring during initial use has been a problem as, for instance, in the case of cylinder walls of internal combustion engines, the trend has been for many years toward the production of what we choose to refer to as absolute surfaces, i. e., surfaces which are of absolute contour and finish wherein the finish has been defined as of the type commonly referred to as a "mirror finish." The efforts that have been extended have been looking toward the production of wearing or bearing surfaces, which, because of their approach toward the absolute, will as so produced operate with a minimum "breaking in" requirement. Through the use of precision instruments and machines, mating bearing surfaces have been brought to a point of a high degree of perfection. The contours of these surfaces have been brought to close conformity. The surfaces have been reduced to a point of mirror finish with the result that in modern high speed machines the wearing in, or breaking in, period of time required has been greately reduced, and the speed at which high speed machinery may be operated at its first start has been greatly increased.

While a great advance in the art has been accomplished through these rather expensive and exacting operations, they have not resulted in the elimination of the problem of wear in, or break in, but have resulted only in a reduction of such requirements through the use of more expensive methods of manufacture and production.

Special lubricants have been developed to aid in the wearing in, or breaking in, of such machine elements. These special lubricants have been of several types, some of which are of an active or corrosive extreme pressure type, so that the lubricant carries a material which, because of its chemical activity or corrosive characteristics, aids in the breaking in of the machine elements. These active extreme pressure lubricants are undesirable for various uses, for example, in certain gear mechanisms where non-ferrous bearing metals subject to chemical attack are in contact with the lubricant and such machine elements must be cleared of active or corrosive lubricants after the break in period is finished. In other cases, such as crankcase lubricants for internal combustion engines, active or corrosive type extreme pressure lubricants can not at any time be used without danger of damage to various of the motor parts.

We have discovered that by pretreating metal wearing or bearing surfaces, that we are enabled to substantially eliminate the wear in and break in periods without the necessity of utilizing active or corrosive extreme pressure lubricants without the danger of scuffing or damaging in any way such wearing or bearing surfaces, and without restriction upon the use of such machine elements as they are first assembled in the machines or constituent instrumentalities used in connection with such machines.

We have discovered that by pretreating such metal or bearing surfaces we are enabled to so modify such surfaces and to produce on, or in connection with such surfaces, properties or qualities which enable the machine elements having such surfaces to be used with practical disregard of the break in or wear in periods heretofore considered essential.

We have further discovered that we can produce machine elements having surfaces so formed that such machine elements are enabled to be operated during the normal wear in or breaking in period without danger of scuffing, seizing, or otherwise damaging the elements themselves.

We have further discovered that by pretreating such metal wearing surfaces we are enabled to so form the surfaces of wearing or bearing elements as to produce a surface which includes fundamentally two distinct properties or qualities, one of which we prefer to refer to as a lubricant retaining property, and the second of which we prefer to refer to as breaking in aid. The lubricant retaining surfaces we have discovered may be formed by pitting the surface as by selective etching, or the like, so as to form upon such surface a multiplicity of fine recesses or pits which receive and retain lubricant, and from which such lubricant is, or may be, dispersed during operation of said wearing or bearing elements. The breaking in aid which we produce in accordance with our invention is what may be referred to as a film. The film is preferably formed both on the surface between the pits and within the pits. The film may be formed as a product of the reaction resorted to to produce the pitted condition of the surface. The film as formed has a particularly beneficial result apparently due to its ability to aid in the wetting of the bearing surface with lubricant, its possible abrading or polishing effect upon such surface, and because of the fact that it provides between the bearing surface a material having an anti-welding effect tending to prevent the welding or fusing together of the metallic surfaces under wearing in conditions.

It is, therefore, an object of our invention to provide a metal bearing or wearing surface for a machine element, which is formed so as to provide a lubricant retaining surface in which lubricant is retained and from which lubricant may be dispersed during the operation of such wearing or bearing surface.

Another object of our invention is to provide a metal bearing or wearing surface for a machine element which has thereon a wear-in agent of extremely fine character.

Another object of this invention is to produce upon the surface of bearing or wearing surfaces a material as a film, which material possesses anti-welding characteristics during bearing or wearing action of said surface.

Another object of this invention is to provide a metal bearing or wearing surface for a machine element which has removed from its surface all portions of the surface which have been loosened from the surface during the machining thereof, and which is further characterized by the fact that its surface is changed in characteristic so as to retain lubricant thereon, and is further characterized by the fact that there is deposited upon the surface of a wear-in agent.

Other objects and advantages of this invention it is believed will be apparent from the following detailed description of a preferred embodiment thereof as illustrated in the accompanying drawing.

In the drawing:

Figure 1 is a diagrammatic illustration diagrammatically illustrating under relatively high magnification a section of a machine element embodying our invention.

Figure 2 is a similar diagrammatic illustration of a modified form of the machine element embodying our invention.

Figure 3 is a similar view of a further modification thereof.

Figure 4 illustrates diagrammatically a preferred embodiment of the invention.

Figure 5 shows in a diagrammatic manner a modified form of a machine element having a frictional surface utilizing the principles of this invention.

As illustrated in the accompanying drawing, 1 indicates the base material of a machine element, which may be of cast iron, steel, or any suitable alloy, or may be of such other metallic structure as is commonly used in the formation of machine elements. This machine element 1 has a bearing or wearing surface 2. The bearing or wearing surface 2 is, as illustrated in Figure 1, characterized by the fact that it has formed therein a multiplicity of extremely fine pits 3, and also in that there is deposited upon the surface 2, both within the pits 3 and upon the surface between the pits 3, a film or deposit 4.

The modification illustrated in Figure 2 is similar to that illustrated in Figure 1 in that it is formed of a metallic base 1$^a$ and has a bearing or wearing surface 2$^a$. This modification of our invention is characterized by the fact that the surface 2$^a$ is formed to provide the multiplicity of pits 3$^a$, but is not provided with a film similar to the film 4.

In the modification illustrated in Figure 3, the machine element is formed of a metallic base 1$^b$, but this machine element is characterized by the fact that there has been deposited upon the wearing or bearing surface 2$^b$ thereof a film 4$^b$, similar to the film 4, but differs from that modification of Figure 1 in that there is no perceptible pitting of the surface 2$^b$. However, in the depositing of the film 4$^b$, it may be that the surface structure immediately underlying the surface 2$^b$ is, due to the action of depositing the film 4$^b$, rendered porous to an appreciable depth below the surface 2$^b$ depending upon the particular materials or agents utilized for the formation, or the deposition, of the film 4$^b$ upon the surface 2$^b$.

The preferred embodiment of Figure 4 is distinguishable from Figure 1 in that the film 4$^c$ is of a thickness less than the depth of the pits 3$^c$. The film thus serves as a lining for the pits and is retained therein even after the remaining portion of the film 4$^c$ present on the high spots of the frictional surface is removed by frictional wear or abrasion.

The modification of Figure 5 is characterized by the fact that only the walls and bottom of the pits 3$^d$ in the frictional surface 2$^d$ of machine element 1$^d$ have the film 4$^d$ thereon. This type of frictional surface may be produced in a number of ways, for instance, by removing the film from the high spots or elevated portions of the surface 2$^c$ by an abrasion or buffing action. The unremoved portion of the film then comprises a lining for the pits formed in the frictional surface.

In the use of bearing or wearing machine elements, the break-in period is usually defined as that initial period of operation during which the elements are in running or wearing contact to produce a satisfactory surface condition which will substantially prevail for subsequent periods of operation. The method embodying our invention contemplates the use of either chemical, electrical, or mechanical means or methods for the purpose of treatment of the surface of the machine element in order to pit, or selectively pit, the said surface. Examples of each of the said methods are given for the purpose of illustration only. An example of the chemical method lies in the use of any chemical agent, inorganic or organic acid, or any chemical media which carries a corrosively active substance which will attack a metal constituent of the surface of the machine element so as to selectively remove certain constituents of the metal surface to leave the same in a pitted or etched condition; as, for example, we may use an inorganic acid which will selectively attack the component parts of the metal to selectively etch out one or more of the components forming the metal surface. By selectively etching to pit the metallic surface we mean that the particular chemical utilized for a period of time, or because of its chemical affinity will act upon portions of the metal at its surface which have different chemical or physical properties, or are differently chemically combined.

Not only does the treatment of the metallic surfaces with chemical agents act to selectively pit, or selectively etch, the surface, but the chemical agent also acts to remove from the surface particles of the metal or metallic alloy which have been loosened on or in the surface by the machining process to which the surface has been subjected. It is well known that during the machining of machine elements there is exhibited a tendency to form upon the surface which is machined loose projecting or embedded particles, or relatively loose particles, which are torn from the surface or embedded therein during the process of machining. These loose particles, when the machine elements are used, tend to break from the surface and are often responsible for scuffing and scarring of the surface of the elements when they are put to use. The loose particles which become loosened from the frictional surface or other surfaces during "wear-in" often travel between the frictional surfaces with the result of scuffing and scarring of the surface. The chemical agent which attacks the surface to selectively pit the same also frees the surface of these loosely held particles.

As a specific example, a machine element, such as a piston ring, cylinder, cylinder liner, or transmission or other gear, is treated with a solution which may be composed of a thousand grams of 37% NaOH to which 50 grams of sulphur are added. This mixture is then heated to 265° F. and stirred until the sulphur is dissolved and the solution becomes clear. This solution we prefer to refer to as the caustic sulphur corrosive solution.

When, for example, the surface of a sample of sorbite steel is treated with, or in, this caustic sulphur corrosive solution, two distinct actions take place; one is the selective etching or pitting of the surface treated, and the other is the deposition upon the surface of a coating or film. The sorbite steel contains, as is well known, steadite, cementite, ferrite, and uncombined, as well as combined, carbon, so that the surface is formed of relatively soft and hard constitutents which form relatively well defined areas. The caustic sulphur solution acts selectively upon the softer constituents of the surface leaving the surface pitted by removal of these softer constituents. The apparent action is to first attack the more reactive microconstituents of the ferrous metal which comprise uncombined ferrous material or free ferrite and then, upon progressive treatment, to attack the other constituent components of the iron or steel. At the same time as the pitting action takes place, there is left upon the surface treated a coating or film of the products of chemical reaction between the caustic sulphur corrosive solution and the constituents of the metallic surface. The degree of pitting, and likewise the degree of deposition of the coating or film, is dependent upon the length of treatment and the strength of the corrosive solution used.

Other examples of treatment with an aqueous alkaline bath containing sulphur include: A treating solution is made up by using 1000 grams of 47% NaOH solution and adding 50 grams of sulfur thereto. This mixture was heated to 265° F and stirred until the sulful was dissolved and the solution became clear. Bearing elements such, for example, as Timken cups were immersed in this bath for one minute after having been brought to about 210° F. by preheating in boiling water. This treatment left a dull black coating on the cups. When subjected to test in the S. A. E. lubricant testing machine as described in the S. A. E. Journal, volume 33, page 402, of 1933, the cups were found to stand the full load (550 lbs.) of the machine without cutting, whereas the same cups without the above treatment but lubricated with the same non-corrosive type extreme pressure lubricant stood a load of only 85 lbs. when cutting occurred. In this test the S. A. E. machine was operated at 535 R. P. M.

A further example lies in the preparation of a similar bath by first heating 140 gallons of caustic soda solution (48 to 50% NaOH) to approximately 220° F. At this point 0.6% by weight of powdered sulfur was added and the solution agitated slightly by means of air for a period of about two hours. During this time heating was continued to bring the temperature up to about 250° F., at which time the bath was ready for use.

Cylinder liners for internal combustion engines were washed in a suitable solvent such as a volatile hydrocarbon thinner and allowed to drain in order to remove a grease coating which was found to be on them. The liners were hung vertically in a rack and introduced into the bath in this position. A small stream of air bubbles was passed through the center of each liner during immersion, thereby furnishing adequate agitation of the solution. A treatment of ten minutes in this bath at a temperature of approximately 250° F. produced a distinct black color on the frictional surface of these machine elements. Upon removal of the treated liners from the bath at the end of the ten minute period, they were thoroughly washed with hot water to remove the treating solution. Because of their elevated temperature the liners dry within a few minutes, after which they are carefully wiped clean. In order to protect the surface as thus treated from the action of the air, they may be coated with a coating of petroleum jelly or other suitable rust preventative.

In the treatment of piston rings, they are immersed in the same solution for a period of 45 minutes with the bath at a temperature of 250° F. to produce a gray discoloration or film. Pistons may be similarly treated, as may other engine elements having ferrous friction surfaces.

The piston rings and liners thus treated are found to wear in more rapidly than untreated parts. Furthermore, it was observed in actual engine tests that less blow-by was produced than ordinarily results during the breaking-in period from gases escaping through irregularities and between parts which do not fit exactly. Elimination or reduction of blow-by decreases formation of carbon on or around the rings and the consequent tendency to accelerate piston ring sticking. Pretreatment of gears accelerates the wearing-in of the frictional surface of the gear teeth. The treatment thus afforded also serves to prevent scuffing or seizing during break-in when the extreme pressure lubricant has a film strength inadequate to carry loads which may be encountered in emergencies or under unusual conditions of operation. As a result of pretreatment, lubricants may be used during the breaking-in period which are either of a less corrosive extreme pressure type or are ordinary lubricating oils, depending upon the adequacy of the treatment given the gears. Similarly, pretreatment of cam shafts and similar surfaces in internal combustion engines serves to prevent scratching or scoring during the initial period of operation of the motor.

There is above set forth specific illustrations as to the use of the caustic sulphur solution in the pretreatment of the ferrous frictional surfaces. Our invention, however, is not limited to the proportions, temperatures or time of treatment above described. It has been found, for example, that temperatures of from 150° F. to 275° F. or higher are satisfactory, depending upon the particular metal treated and the time of treatment. At temperatures lower than 150° F. the rate of chemical reaction is considerably reduced, which necessitates a longer time of treatment. At temperatures higher than 275° F. difficulties from warping or distortion of the machine elements may result. Where, however, such difficulties are not liable to be encountered, 275° F. does not form the upper limit at which such treatment may be had. It will be obvious that such alternative temperatures are operative and are not to be regarded as outside the scope of the invention in its broad aspect.

The strength of the alkali solution utilized may vary widely. In general, it is found desirable to have at least 25% of caustic soda and that more than 60% is unjustifiable. From approximately 30% to approximately 50% NaOH appears at present to be the optimum proportion, although higher concentrations may be used in special cases. In order to have a practical rate of reaction, at least ½% of sulfur should be present in the bath; and in order to avoid unduly fast chemical reaction with possible attending difficulties of control and flaking of the coating, no more than 15% of sulfur is desired. This, however, depends to a considerable degree upon the time of treatment and the temperature of treatment. The preferred range of sulfur content is from approximately 1% to approximately 5% for practical reasons.

Other alkali hydroxides may be substituted for the sodium hydroxide used in the bath. It has been observed that the strong hydroxides give a faster rate of treatment. A bath containing calcium hydroxide and sulfur is operative to produce a sulfide film, but the treatment is much less satisfactory than when stronger alkalies are utilized.

The method of operation by this treatment which enables the surface as treated to be operated at greatly increased bearing pressures with lubrication with ordinary lubricant is apparently that due to the fact of selective etching of the surface and the film or coating deposited thereon. There is formed on the surface during such treatment a multiplicity of extremely fine pits or depressions due to the selective removal of parts of the surface. These pits act as wells for the reception of the lubricant used whereby lubricant is maintained in the wells between the wearing or bearing surfaces so that the surfaces are at all times maintained with the requisite lubricant during the wearing in or breaking-in process. As breaking or wearing in of the wearing or bearing surfaces is the result of wear between these surfaces, in order to make the two surfaces conform in shape and curvature, the pitted surfaces wear more readily to the curvature because under high pressures the metallic constituents, for example, cementite in the case of certain ferrous metals which are not attacked and which form what might be termed the high spots of the surface between or around the pits or lubricant wells more readily wear and are also more readily removed under high pressure so that the surfaces more readily and quickly wear to conformity. The lessening of the surface area by the formation of the multiplicity of pits enables the wearing process to take place more rapidly, and as the surfaces are lubricated from the wells or pits, the wearing in takes place without danger of scuffing, scarring, or seizing. Also, as will be apparent from the foregoing, the process which has been used to treat the surface has removed from the surface those particles of metal which have been loosened during the machining process of the surface so that the danger of scratching the surface is greatly reduced.

The action of the film or coating left upon the surface during this process is in all probability four-fold. First it acts as an aid to the retention of lubricant on the surface, being as it is, an extremely fine chemical product of the chemical reaction between the metallic surface and the particular chemical agent used to react with the surface metal. Secondly, this extremely fine chemical iron compound acts, or may act, as a polishing agent during the wearing in process, accelerating the wear in. Thirdly, the film as formed produces between the wearing or bearing surface a compound which may inhibit welding; in other words, the film or deposited coating has anti-welding characteristics tending to prevent welding of the surfaces or surface particles to the surfaces. Fourthly, the film facilitates the wetting of the metal surface by the lubricant and thereby affords an improved lubricating action.

The foregoing examples are given merely as illustrative and other examples include the treatment of the surfaces with inorganic acids such as hydrochloric acid, nitric acid, phosphoric or phosphorous acids, or other inorganic acids which will act to selectively etch the wearing surfaces either with or without producing a film or coating upon the surface. Likewise it is possible to select chemical agents which will act substantially uniformly upon the surface without to any material degree acting to selectively etch the surface but which act to leave upon the surface of the wearing or bearing element a film or coating, which in itself is a great aid to the wearing in or breaking-in of the machine element as it acts, as heretofore set forth, as an anti-welding media, as a polishing agent, or to maintain lubricant upon the surface so that the process of wearing in is greatly accelerated.

A series of tests have shown that the pitting of the surface alone acts to greatly increase the bearing pressure to which said machine elements may be instantaneously subjected without failure, even when the coating or film is removed. These tests show that with the film or coating present upon the surface the pressures to which said machine elements may be subjected without failure are greatly increased during the wearing or breaking-in process, showing the additional advantage of the coating or film. This phenomenon is peculiar in that the results obtained by these tests differ with relation to the speed of operation of the wearing or breaking-in process. At relatively lower speeds in some cases the presence of the coating or film has been shown to have had little, if any, effect. At high speeds, however, the tests show that the presence of the film or coating is a great aid to the wearing in or breaking-in process, showing that at high speed a great portion of the added efficacy of results is due to the presence of film or coating. For example, and as showing different examples of treatment, the following table is given showing a comparison between the etched surface without the film and the etched surface with the film at speeds of 535 R. P. M. and 1000 R. P. M. respectively, where the particular experiments were conducted with the S. A. E. tester, made and operated substantially as described in the S. A. E. Journal of December, 1933, at page 402. In this table there is also set forth the results of the tests upon the same material untreated and the results of the tests conducted upon the same material treated to produce a mirror finish. This table shows:

there is set forth four lengths of time of treatment with the alkali sulfur or caustic sulfur solution and that from this table it will be apparent that the longer the treatment the more beneficial are the results produced. It will be noted that the alkali sulfur or caustic sulfur treatment shows that the major or substantially entire effect of treatment at the comparative low speed of 535 R. P. M. is due to the etching action and that, as compared with the untreated sample, the load carried by the treated sample increased from approximately two to one with the three minute treatment up to substantially four to one with the sixty minute treatment. At the higher speed of operation a major portion of the improved results is shown to be due to the deposited film.

In the case of the caustic sulfur corrosive treatment, the film formed is apparently an iron or ferrous sulfide. This film of iron sulfide may also be formed through the use of many other chemical agents, among which are sulfurized fatty oils, extreme pressure lubricants containing free sulfur, or polysulfide solutions. In the case of the use of phosphoric acid solution as, for example, through the use of a 10% aqueous solution of $H_3PO_4$ which is saturated with $Fe_3(PO_4)_2$ the film is apparently a phosphate film or coating.

In the case of the use of hydrochloric acid or other halogen acids, the coating formed would be an iron chloride, or an iron halogen, and tests have indicated that the coating may be formed also as an iron selenide, or an iron telluride.

Treated Specimens

S. A. E. tester results

[Rubbing ratio=14.6 to 1. Loading rate=83.5 lb./sec. Values reported are scale loads; total loads are 10 times as large.]

| Treatment | Load at failure—535 R. P. M. | | | | | Load at failure—1,000 R. P. M. | | | | |
|---|---|---|---|---|---|---|---|---|---|---|
| | Untreated (1) | As treated (2) | Treated, but with film electrically removed (3) | Effect of film (2)-(3) | Effect of etch (3)-(1) | Untreated (5) | As treated (6) | Treated, but with film electrically removed (7) | Effect of film (6)-(7) | Effect of etch (7)-(5) |
| None | 120 | | | | | 30 | | | | |
| Mirror | 120 | 220 | | | 100 | 30 | 236 | | | [1]206 |
| Alkali-sulfur—3 min | 120 | 413 | 350 | 63 | 230 | 30 | 228 | 90 | 138 | 60 |
| Alkali-sulfur—10 min | 120 | 468 | [2]462 | 6 | 342 | | | | | |
| Alkali-sulfur—15 min | 120 | 542 | 542 | 0 | 422 | 30 | 202 | 123 | 79 | 93 |
| Alkali-sulfur—60 min | 120 | 570+ | 570+ | | 450+ | 30 | 422 | 178 | 244 | 148 |
| 10% Nital | 120 | 333 | 554 | −221 | 434 | 30 | 105 | 160 | −55 | 130 |
| Pyruvic acid | | | | | | 30 | 273 | 120 | 153 | 90 |
| Anodic etching | 120 | 570+ | | | 450+ | 30 | 100 | | | 70 |
| Sand blasting (extra fine) | | | | | | 30 | 78 | | | 48 |
| Sand blasting | 120 | 570+ | | | 450+ | 30 | 93 | | | 63 |

[1] Effect of improving finish.  [2] Buffed after second treatment.

In this table there is shown the load at failure after the film has been removed electrolytically. This means that the film or coating deposited on the metallic sample was removed by immersing the sample in an electrolytic solution in an electrolytic cell where the treated metal surface is made the cathode and the solution consists of dilute sulphuric acid and then washing the treated surface or element in running water and scrubbing the same with a soft bristle brush. Tests showed that no metal is lost during this treatment regardless of the length of time of treatment.

In the foregoing table it will be noted that

Substantially any known etching agent may be utilized, including both inorganic and organic acids among which are the following acids given for the purpose of illustration in connection with which acids there is set forth the structural formula of such acids, the temperature duration of treatment, and the load carrying capability of the treated surface as compared with the untreated surface wherein the same type of lubricant was utilized in conducting of all tests tabulated. It will be obvious that this table only sets forth a portion of such acids which are usable and is given merely as an example of the extensive field of such treating agents.

Load Carrying Capacities

S. A. E. tester—535 R. P. M.

| Agent | Concentration, weight per cent | Structural formula | Treatment Average temperature | Treatment Duration | Test cut at— |
|---|---|---|---|---|---|
| | | | °F. | Minutes | Pounds |
| Untreated surface | | | | | 85 |
| Hydroxy acids: | | | | | |
| Citric acid | 10 | COOH—CH$_2$—C(COOH)(OH)—CH$_2$—COOH | 190 | 45 | *540+ |
| Citric acid | 10 | | 180 | 15 | 510 |
| Tartaric acid | 10 | COOH—CH(OH)—CH(OH)—COOH | 185 | 30 | 572 |
| Malic acid | 10 | COOH—CH(OH)—CH$_2$—COOH | 170 | 10 | 452 |
| Lactic acid | 10 | CH$_3$—CH(OH)—COOH | 170 | 60 | 441 |
| Gluconic acid | 10 | CH$_2$(OH)—CH(OH)—CH(OH)—CH(OH)—CH(OH)—COOH | 185 | 15 | 418 |
| Unsubstituted acids: | | | | | |
| Succinic acid | 10 | COOH—CH$_2$—CH$_2$—COOH | 185 | 30 | 219 |
| Oxalic acid | 10 | COOH—COOH | 185 | 30 | 223 |
| Acetic acid | 10 | CH$_3$—COOH | 185 | 30 | 215 |
| Cocoanut fatty acids in absolute alcohol (10%) | | | 170 | 135 | 132 |
| Unsaturated acid: Maleic acid | 10 | COOH—CH=CH—COOH | 165 | 10 | 564 |
| Miscellaneous: | | | | | |
| Tannic acid | 10 | | 170 | 15 | 286 |
| Pyruvic acid | 10 | CH$_3$—CO—COOH | 172 | 15 | 175 |
| Salicylacetic acid | 5 | C$_6$H$_4$(OCH$_2$COOH)(COOH) | 178 | 60 | 263 |
| Nitrogen compounds: | | | | | |
| dl—Alanine | 10 | CH$_3$—CH(NH$_2$)—COOH | 172 | 15 | 320 |
| dl—Glutamic acid | 7 | COOH—CH$_2$—CH$_2$—CH(NH$_2$)—COOH | 172 | 15 | 247 |
| Ortho nitrophenol | 1 | C$_6$H$_4$(NO$_2$)(OH) | 175 | 70 | 255 |
| Sulphonic acids: | | | | | |
| Diphenylparasulphonic acid | 10 | C$_6$H$_5$—C$_6$H$_4$—SO$_3$H | 180 | 30 | [1] 650+ |
| Sulphanilic acid | 6 | NH$_2$—C$_6$H$_4$—SO$_3$H | 185 | 36 | 506 |
| Sulphanilic acid | 6 | NH$_2$—C$_6$H$_4$—SO$_3$H | 180 | 6 | 480 |
| Heavy petroleum sulphonic acid | 10 | | 185 | 60 | 126 |
| Water-soluble petroleum sulphonic acid (average molecular wt.=250) | 10 | | 185 | 30 | 226 |
| Sulfur compounds: Thioglycolic acid | 10 | SH—CH$_2$—COOH | 180 | 30 | [1] 580+ |
| Chlorine compounds: | | | | | |
| Trichloracetic acid | 10 | CCl$_3$—COOH | 190 | 30 | [1] 540+ |
| Trichloracetic acid | 10 | CCl$_3$—COOH | About 160 | 15 | 232 |
| Hydrochloric acid | 0.6N | HCl | 180 | 30 | [1] 548+ |

[1] Cups were not cut when machine automatically shut down at full load. Variations in shut down load are due to difficulty in resetting controls on machine.

Analysis of the results obtained by the use of these acids in the pretreatment of the ferrous frictional surfaces shows:

If a comparison be made between the results obtained by treatment with acetic acid (215 lbs.), lactic acid (441 lbs.) and thioglycolic acid (full load of the machine—more than 580 lbs.), all three of which are monobasic carboxylic acids, the first with no substituted groups, the second with a hydroxy group in the alpha position, and the third with a mercapto group in the same place, it is seen that the presence of the hydroxy group is extremely beneficial and that the closely related mercapto group is even more so. Two hydroxy groups are indicated to be more effective than one by comparing the results with tartaric acid (572 lbs.) and of malic acid (452 lbs.).

A comparison of lactic acid, dl-alanine, and pyruvic acid shows that, when substituted in the alpha position of a mono-basic straight chain acid, the order of decreasing effectiveness of substituents is hydroxy, amino, and keto groups.

The unsaturated carbons adjacent to the carboxyl groups in maleic acid (564 lbs.) show a highly beneficial effect when compared with results obtained from succinic acid (219 lbs.).

Chlorine is an effective substitute in acids as shown by increase in load carry capacity of trichloroacetic acid (540 lbs.) over that of acetic acid (215 lbs.). Hydrochloric acid itself is extremely effective even though the film produced is theoretically water-soluble. Apparently a portion of the metal chloride formed by this acid is retained tenaciously on the metal surface.

The heavy petroleum sulfonic acids used in the tests indicated are easily dispersible in water but are not truly soluble therein as shown by the fact that these acids impart some cloudiness to the water. The water soluble petroleum sulfonic acids dissolve to give clear water solutions. Comparison of the above two acids shows the water soluble ones to be much more effective for the purposes of this invention. Likewise, comparison of the effectiveness of cocoanut oil fatty acids (132 lbs.) which are water insoluble and acetic acid (215 lbs.) or succinic acid (219 lbs.) shows that the most effective reagents are water soluble.

It is evident from the above presented facts that when steel surfaces are treated with water soluble organic or chlorine-containing acids, increased load carrying capacities are obtained. Mono- and poly-basic acids, both saturated and unsaturated, unsubstituted and substituted with either mercapto, hydroxy amino, keto or halogen substituents; substituted aromatic acids, substituted and unsubstituted aromatic sulfonic acids, and substituted phenols, comprise effective treating agents.

It is also apparent from the above disclosure that there are many acids within the scope of our invention which have sufficient activity to attack the metal surface to be treated and to form thereon the required integral tenacious adherent film.

When treating case-hardened metals, the treatment should be controlled so that only a portion of the hardened encasing metal is attacked by our reagents. The remaining portion of the hardened metal is then retained and there is no substantial alteration in the hardness of the underlying metal surface of the treated article.

The selective etching performed by the 10% Nital solution is, as will be observed from the foregoing table, exceptional in that the load-carrying characteristic of the bearing or wearing element is enhanced by the removal of the coating formed. The solution utilized was 10% of nitric acid in 90% of ethyl alcohol, 85% concentration.

We have noted in this table that the element treated with nitric acid was more effective after the removal of the coating or film than it was before the coating was removed. This is true both at high and low speeds.

In the selective etching of material by anodic etching, the material to be etched is made the anode in an electrolytic cell, the cell being formed of a dilute solution of sulfuric acid or other acid.

The result obtained by the nital etching is exceptional, but is believed not to depart from the unusual effects noted of nitric acid on iron surfaces. The tests made indicate that better results are obtained when this film is removed. This may be due to many causes which are not fully understood by applicants at the present time. The nital etching may, for example, leave the iron surface in such condition as to be in a particularly good condition for welding with the film thereon, or the film may not act to retain lubricant. Many other theoric explanations of this particular phenomenon might be given.

The sand-blasting method used consisted of forcing rather fine sand against the bearing or wearing element under the influence of high air pressure so that the action of the sand is to pit the surface.

Other etching agents which are commonly known may of course be used, depending in some instances upon the particular steel or ferrous metal frictional surface used as, for example, the common etching agents such as nitric acid and alcohol, picric acid and alcohol, alcohol and hydrochloric acid, etc., may be employed.

The machine elements treated in accordance with our invention may be used in connection with any desired lubricant such, for example, as ordinary lubricating oils or the so-called extreme pressure lubricants, either of the active or corrosive type or of the non-corrosive type, as desired. The action of the machine elements of our invention in wearing or breaking-in is apparently that the pits of the surface retain the lubricating oil; the film deposited on the surface is apparently also active, both as produced upon the surface and as carried by the lubricant over the surface. A great portion of the film is, as the elements wear in, picked up and carried by the lubricating oil so that the lubricant both forms a lubricating medium and is an effective carrier for the anti-welding agent produced.

The film is likewise formed in the pits and adheres to the side walls and bottom thereof, aiding the pits in holding and retaining the lubricating oil and may be thought of as an agent for reducing the interfacial tension between the oil and the metal so that the oil will more readily be retained in the microscopic pits and facilitate their action as oil reservoirs. The films produced are more easily wetted with oil than the plain metal surfaces, and the films may act as an abrading or polishing agent as the films produced are of a friable nature which is readily converted into a fine powder by the frictional rubbing of the surfaces during use.

While the method of chemical treatment of a ferrous surface is indicated as by chemical solution or suspension of the active chemical agents, it is to be understood that our invention may be carried out in any one of a number of different ways not dependent upon solution or suspension of the chemically active treating agent. For example, the treatment may be either by gas or vapor or in solution or suspension as indicated, or by the use of the solid treating agents. Examples of the treatment with gases include the treatment by subjecting the ferrous frictional surface to the action of hydrogen sulfide gas, hydrochloric acid vapor, or to the action of other gaseous or vaporized treating agents at the desired temperature of treatment. Many examples of the treatment of the ferrous frictional surfaces with solutions or suspensions or chemicals have heretofore been given. The surfaces may also under certain conditions be treated with solid treating agents. An example of the mode of treatment through the use of a solid treating agent is to dust the ferrous frictional surface with sulfur, or a sulfur-releasing compound, in such manner as to hold the compound in contact with the metal when subsequent heating steps are involved, as by use of adherent liquid films or by other expedients such as by use of a binder mixed with a sulfur or sulfur-releasing compound. The ferrous metal frictional surface treated by one of the methods as hereinabove set forth may be used with any suitable lubricant. For example, they may be used with ordinary lubricants or they may be lubricated with extreme pressure lubricants. In extreme cases corrosive extreme pressure lubricants may also be utilized. Under the classification of extreme pressure lubricants may be classed both corrosive and non-corrosive lubricants, as follows: Corrosive extreme pressure lubricants contain for instance free sulfur or corrosive sulfur compounds, and milder extreme pressure lubricants contain non-corrosive compounds of sulfur or other metals which eventually react with the metal surface being lubricated to form a protective film which prevents scuffing or seizure.

The significance of the term "non-corrosive lubricant" is well understood in the lubricating art. As an example of the line of division between corrosive and non-corrosive extreme pressure lubricant, such a lubricant of the sulfur-bearing type is regarded as corrosive if it darkens a polished copper strip immersed in the lubricant for one-half hour at 300° F., and is regarded as non-corrosive if no discoloration occurs under these conditions. One type of non-corrosive lubricant is a lubricant of mineral oil containing 10% sulfurized lard oil and 5% lead naphthenate. A suitable sulfurized lard oil is one which contains 5% of sulfur in the combined state.

In the specific examples given the treatment is indicated for such machine or wearing elements as are made of steel, cast iron, or alloyed steels, all of which have what we desire to define as a ferrous wearing surface in that the principal component of the wearing or frictional surface is, before treatment, principally composed of iron, either in its free or combined state.

It has been found that corrosion-resistane alloy steels can best be treated in a multi-stage process using different treating agents. Examples of such steels are chromium steels, nickel steels and chromium-molybdenum steels, e. g. steel alloys known under the S. A. E. designations of 4140 steel and 3340 steel.

The multi-stage treatments may be carried out by first treating such alloy steels with a highly corrosive pitting agent which forms water-soluble reaction products with the steel. Examples of such pitting agents are the mineral acids: sulfuric acid and hydrochloric acid-nitric acid may be used in some cases. The action of this type of agent is principally to corrode and pit the metal surface by a selective action on micro-constituents thereof. After this treatment with the pitting agent the treated surface may be washed to remove the acid and reaction product.

The second stage of the treatment is carried out with a treating agent capable of forming lubricant-retaining water-insoluble films on the pitted frictional surface. Numerous examples of this type of treating agent are disclosed in the foregoing specification and may be utilized. Lubricant-retaining water-insoluble film-forming agents which are preferred are the aqueous phosphoric acid solutions and the aqueous sodium hydroxide sulfur-containing baths hereinbefore disclosed. Additional examples of the second type of treating agent are the water-soluble organic acids, such as oxalic acid, tartaric acid, chlorine-containing organic acids, and mercapto substituted acids disclosed in the present specification.

The above-disclosed combination treatment yields improved results on corrosion-resistant steel alloys and reduces the time required to obtain a satisfactory treatment.

This application is a continuation-in-part of our application Serial No. 235,542, filed October 17, 1938 issued as Patent No. 2,266,377 on December 16, 1941, which in turn is a continuation-in-part of our application Serial No. 74,394 filed April 13, 1936.

Having fully described our invention, it is to be understood that we do not wish to be limited to the details herein set forth, but our invention is of the full scope of the appended claims.

We claim:

1. The process of preventing scuffing and scoring between ferrous metal bearing surfaces under extreme pressures which comprises case-hardening said ferrous metal bearing surface and pretreating said case-hardened surface by chemically reacting said surface with a corrosive agent to form thereon an integral thin lubricating film, and controlling said chemical reaction so that only a portion of the hardened encasing metal is attacked whereby the remaining portion of the hardened metal is retained without substantial alteration in the hardness of the treated element.

2. A machine element having a case-hardened ferrous metal frictional wearing surface and a multiplicity of lubricant-retaining pits from said surface extending only a portion of the way through the hardened encasing metal, said surface being characterized by its ability to resist failure under initial extreme pressure loads and having a lubricating film deposited upon the surface and in the pits, said film being a reaction product of the metal of the element and the chemical used for the formation of the pits.

3. A machine element having a case-hardened ferrous metal frictional wearing surface and a multiplicity of fine pits from said surface extending only a portion of the way through the hardened encasing metal, said pits acting to provide lubricant-receiving reservoirs during frictional wear and initially when said surface is under extreme pressure load.

4. A machine element having a case-hardened ferrous metal frictional wearing surface and a multiplicity of lubricant-retaining pits from said surface extending only a portion of the way through the hardened encasing metal, said surface being characterized by its ability to resist failure under initial extreme pressure loads and having a lubricant-retaining agent in said pits.

5. A process of improving the frictional load carrying characteristics of machine elements under initial load and when lubricated, said elements having a ferrous metal frictional surface, which comprises, cleaning said frictional surface by degreasing with a volatile solvent, etching said surface to remove a substantial portion of the more reactive micro-constituents of said ferrous metal, simultaneously forming pits in said surface and forming a lubricant-retaining film on said surface, removing the etching and pitting agent from said surface by washing, and applying a rust-preventing film on said treated surface.

6. A process for improving the frictional load carrying characteristics of machine elements under initial load and when lubricated, said elements having a corrosion-resistant steel alloy frictional surface, which comprises first etching said surface with a chemically corrosive pitting agent and then forming a lubricant-retaining film on said surface comprising the reaction product of the metal and a chemical agent capable of reacting therewith to form a water-insoluble film thereon.

7. A process for improving the frictional load carrying characteristics of machine elements under initial load and when lubricated, said elements having a corrosion-resistant ferrous metal frictional surface, which comprises etching said surface with a mineral acid to form pits therein and subsequently forming a lubricant-retaining water-insoluble film on said etched surface.

8. A process for improving the frictional load carrying characteristics of machine elements under initial load and when lubricated, said elements having a corrosion-resistant ferrous metal frictional surface, which comprises etching said surface with sulfuric acid to form pits therein and subsequently forming a lubricant-retaining water-insoluble film on said etched surface.

9. A process for improving the frictional load carrying characteristics of machine elements under initial load and when lubricated, said elements having a corrosion-resistant ferrous metal frictional surface, which comprises etching said surface with a mineral acid to form pits therein and subsequently forming a lubricant-retaining water-insoluble film on said etched surface by chemical reaction with an aqueous phosphate solution.

10. A process for improving the frictional load carrying characteristics of machine elements under initial load and when lubricated, said elements having a corrosion-resistant ferrous metal frictional surface which comprises etching said surface with a mineral acid to form pits therein and subsequently forming a lubricant-retaining water-insoluble film on said etched surface by chemical reaction with an aqueous solution of a strong alkali and dissolved sulfur.

11. A process for improving the frictional load carrying characteristics of machine elements under initial load and when lubricated, said elements having a corrosion-resistant ferrous metal frictional surface, which comprises electrolytically etching said surface to form pits therein and subsequently forming a lubricant-retaining water-insoluble film on said etched surface.

12. A process for improving the frictional load carrying characteristics of machine elements under initial load and when lubricated, said elements having a corrosion-resistant ferrous metal frictional surface, which comprises electrolytically etching said surface in a sulfuric acid bath to form pits therein and subsequently forming a lubricant-retaining water-insoluble film on said etched surface.

13. A process for improving the frictional load carrying characteristics of machine elements under initial load and when lubricated, said elements having a corrosion-resistant ferrous metal frictional surface, which comprises electrolytically etching said surface to form pits therein and subsequently forming a lubricant-retaining water-insoluble film on said etched surface by chemical reaction with an aqueous phosphate solution.

14. A process for improving the frictional load carrying characteristics of machine elements under initial load and when lubricated, said elements having a corrosion-resistant ferrous metal frictional surface, which comprises electrolytically etching said surface to form pits therein and subsequently forming a lubricant-retaining water-insoluble film on said etched surface by chemical reaction with an aqueous solution of a strong alkali and dissolved sulfur.

GEORGE L. NEELY.
BRUCE B. FARRINGTON.
VICTOR N. BORSOFF.